United States Patent [19]

Haas et al.

[11] Patent Number: 4,499,004

[45] Date of Patent: Feb. 12, 1985

[54] LIQUID CRYSTAL DIELECTRICS, NEW DYESTUFFS USEFUL THEREIN, PROCESSES FOR THEIR PREPARATION, AND ELECTROOPTICAL DISPLAY ELEMENTS BASED THEREON

[75] Inventors: Günther Haas, Neckargemünd; Georg Weber, Erzhausen, both of Fed. Rep. of Germany

[73] Assignee: Merck Patent Gesellschaft mit beschrankter Haftung, Darmstadt, Fed. Rep. of Germany

[21] Appl. No.: 462,153

[22] Filed: Jan. 28, 1983

[30] Foreign Application Priority Data

Jan. 28, 1982 [DE] Fed. Rep. of Germany ....... 3202761

[51] Int. Cl.³ .......................... G02F 1/13; C09K 3/34
[52] U.S. Cl. ............................ 252/299.1; 260/396 R; 350/349
[58] Field of Search ..................... 252/299.1; 350/349; 260/396 R

[56] References Cited

U.S. PATENT DOCUMENTS

| | | | |
|---|---|---|---|
| 619,114 | 2/1899 | Bally | 260/396 R |
| 631,613 | 8/1899 | Bohn | 260/396 R |
| 647,370 | 4/1900 | Bohn | 260/396 R |
| 668,445 | 2/1901 | Hess | 260/396 R |
| 669,894 | 3/1901 | Bohn | 260/396 R |
| 1,991,885 | 2/1935 | Ellis et al. | 260/396 R |
| 2,301,382 | 1/1940 | Dicket et al. | 260/396 R |
| 2,311,032 | 2/1943 | Dicket et al. | 260/396 R |
| 3,479,374 | 11/1969 | Hargis et al. | 260/396 R |
| 4,288,147 | 9/1981 | Koch | 252/299.1 |
| 4,304,683 | 12/1981 | Morinaka et al. | 252/299.1 |
| 4,360,447 | 11/1982 | Morinaka et al. | 252/299.1 |
| 4,363,743 | 12/1982 | Moeller et al. | 252/299.1 |
| 4,376,715 | 3/1983 | Cognard et al. | 252/299.1 |
| 4,383,738 | 5/1983 | Funada et al. | 252/299.1 |
| 4,428,858 | 1/1984 | Cognard et al. | 252/299.1 |

FOREIGN PATENT DOCUMENTS

| | | | |
|---|---|---|---|
| 26004 | 4/1981 | European Pat. Off. | 252/299.1 |
| 38460 | 10/1981 | European Pat. Off. | 252/299.1 |
| 69257 | 1/1983 | European Pat. Off. | 252/299.1 |
| 167641 | 3/1905 | Fed. Rep. of Germany | 260/396 R |
| 21297 | of 1898 | United Kingdom | 260/396 R |
| 1012800 | 12/1965 | United Kingdom | 252/396 R |
| 2037803 | 7/1980 | United Kingdom | 252/299.1 |
| 2069518 | 8/1981 | United Kingdom | 252/299.1 |
| 2086409 | 5/1982 | United Kingdom | 252/299.1 |

OTHER PUBLICATIONS

Singh, R., et al., Indian J. Chem., vol. 15B, pp. 970-971, (1977).
Matsuoka, M., et al., Chem. Lett., pp. 627-630, (1979).
Sankawa, U., et al., vol. 25, pp. 2392-2395, (1977), Chem. Pharm. Bull.
J. Chem. Soc., pp. 1095, (1955).
Helv. Chim. Acta, vol. 26, p. 95, (1943).
Carhb, RN 6486-81-3, 1,4-Naphthoquinone,5,8-Dihydroxy-2-Phenoxy, (NS 1965-1971).
Carhb, RN 47123-72-8, 1,4-Naphthalenedione,5-,8-Dihydroxy-2-(Phenylamino), (Suppl. 1974).
Blackburn, C., et al., Mol. Cryst. Liq. Cryst., vol. 101, pp. 341-349, (1983).
Katti, S. B., et al., Indian J. Chem., vol. 18B, pp. 440-442, (1979).

Primary Examiner—Teddy S. Gron
Attorney, Agent, or Firm—Millen & White

[57] ABSTRACT

A new liquid crystal dielectric contains at least one dyestuff of formula I

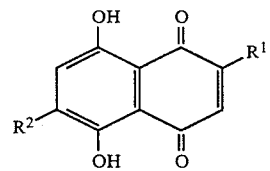

wherein $R^1$ and $R^2$ are identical or different and each is alkyl or alkoxy each of 3 to 8 C atoms or a group Z—Y—, or one of $R^1$ and $R^2$ can also be hydrogen, methyl, ethyl, methoxy or ethoxy; Z is R—Ph—, R—Ph—Ph—, R—Cy—, R—Cy—Cy—, R—Cy—Ph— or R—Ph—Cy—; Ph is 1,4-phenylene; Cy is 1,4-cyclohexylene; Y is —$CH_2$—, —O—, —S—, —NH—, —$CH_2CH_2$—, —$CH_2$—O—, —$CH_2$—S—, —$CH_2$—NH—, or a direct bond; and R is hydrogen or alkyl or alkoxy, each of 1-8 C atoms.

11 Claims, No Drawings

LIQUID CRYSTAL DIELECTRICS, NEW DYESTUFFS USEFUL THEREIN, PROCESSES FOR THEIR PREPARATION, AND ELECTROOPTICAL DISPLAY ELEMENTS BASED THEREON

BACKGROUND OF THE INVENTION

In electrooptical display elements containing liquid crystal dielectrics, the electrooptical effect of the display can be produced by embedding pleochroic dyestuffs ("guest phase") in a liquid crystal matrix ("host phase"). In this context, see the surveys by COX, Mol. Cryst. Liq. Cryst., Volume 55, pages 1–32 (1979); JONES and REEVE, ibid., Volume 60, pages 99–110 (1980); GRAY, Chimia, Volume 34, pages 47–58 (1980) and the literature quoted therein, all of whose disclosures are entirely incorporated by reference herein.

However, the dyestuffs which have hitherto been used for this purpose, in particular the red dyestuffs hitherto used, fulfill the imposed requirements (for example high order parameter, satisfactory solubility in the host phase, and stability to UV and visible light and to voltages of up to about 20 V) only to an unsatisfactory extent.

SUMMARY OF THE INVENTION

Accordingly, it is an object of this invention to provide pleochroic dyestuffs, in particular red dyestuffs, which do not have the disadvantage of the known dyestuffs, or which display them only to a lesser extent, and which are suitable as constituents of liquid crystal dielectrics.

Upon further study of the specification and appended claims, further objects and advantages of this invention will become apparent to those skilled in the art.

The present invention has achieved these objects by providing new liquid crystal dielectrics containing one or more pleochroic dyestuffs for electrooptical display elements, and which contain at least one dyestuff of formula I

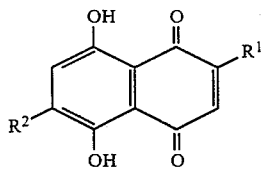

wherein $R^1$ and $R^2$ are identical or different and are alkyl or alkoxy each of 3 to 8 C atoms or a group Z—Y—, or one of $R^1$ and $R^2$ can also be hydrogen, methyl, ethyl, methoxy or ethoxy: Z is R—Ph—, R—Ph—Ph—, R—Cy—, R—Cy—Cy—, R—Cy—Ph— or R—Ph—Cy—; Ph is in each case a 1,4-phenylene radical: Cy is in each case a 1,4-cyclohexylene radical: Y is —$CH_2$—, —O—, —S—, —NH—, —$CH_2CH_2$—, —$CH_2$—O—, —$CH_2$—S—, —$CH_2$—NH— or a direct bond; and R is hydrogen or alkyl or alkoxy each of 1–8 C atoms.

It has been found that these compounds of formula I have a surprisingly high order parameter and are readily soluble in liquid crystal matrices. They are also stable to UV and visible light and to voltages, and also have a good chemical stability.

Some of the compounds of formula I are known, namely 2-anilino- (I, $R^1$ is anilino, $R^2$ is H; compare Helv. Chim. Acta, Volume 26, page 95 (1943), which disclosure is entirely incorporated by reference herein); 2,-p-anisidino- (I, $R^1$ is p-anisidino, $R^2$ is H; ibid.): 2,6-bis-anilino- (I, $R^1$ and $R^2$ are anilino; ibid.), 2-p-tolylthio- (I, $R^1$ is p-tolylthio, $R^2$ is H; compare J. Chem. Soc. 1955, page 1095, whose disclosure is incorporated by reference herein) and 2,6-bis-p-tolylthio-5,8-dihydroxy-1,4-naphthoquinone (I, $R^1$ and $R^2$ are p-tolylthio; ibid.). However, the use of these compounds as constituents of liquid crystal dielectrics has not been suggested heretofore.

Thus, this invention relates to the liquid crystal dielectric mentioned above, and furthermore to compounds of formula I, with the proviso that (a) $R^1$ and $R^2$ are not simultaneously p-tolylthio and not simultaneously anilino; (b) $R^1$ is p-tolylthio, anilino or p-anisidino only when $R^2$ is other than H; and moreover to a process for the preparation of the latter compounds, comprising hydrolyzing a diaminonaphthoquinone of formula II

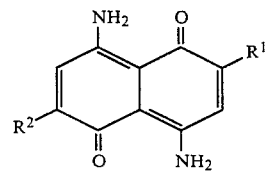

wherein $R^1$ and $R^2$ are as defined above, or for the preparation of a compound of formula I wherein $R^1$ is Z—S— or Z—NH—, reacting a naphthazarine derivative of formula III

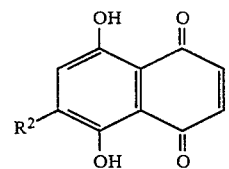

wherein $R^2$ is as defined above, with a compound of formula IV $$Z-XH \qquad IV$$

wherein X is —S— or —NH— and Z is as defined above.

This invention also relates to the use of a compound of formula I as a constituent of a liquid crystal dielectric useful in electrooptical display elements, and to an electrooptical display element based on a guest/host liquid crystal cell, containing a liquid crystal dielectric of this invention.

DETAILED DISCUSSION

In the following text, $R^1$, $R^2$, Z, Ph, Cy, Y, R and X are as defined above, unless expressly indicated otherwise.

In the compounds of formulae I to IV, the alkyl and alkoxy groups are preferably straight-chained. They preferably contain 3–7 C atoms. Accordingly, alkyl is, in particular, propyl, butyl, pentyl, hexyl or heptyl, and also preferably octyl, isopropyl, 2-methyl-propyl, 2-methyl-butyl, 3-methyl-butyl, 2-methyl-pentyl, 3-methyl-pentyl, 1-methyl-hexyl, 2-ethyl-hexyl or 1-methyl-heptyl; alkoxy is, in particular, propoxy, butoxy, pentyloxy, hexyloxy or heptyloxy, and furthermore preferably octyloxy, isopropoxy, 2-methyl-propoxy, 2-methyl-butoxy, 3-methyl-butoxy, 2-methyl-pentyloxy, 3-methyl-pentyloxy, 1-methylhexyloxy, 2-ethylhexyloxy or 1-methyl-heptyloxy. The radical R and one of the radicals $R^1$ or $R^2$ can moreover also be methyl, ethyl, methoxy or ethoxy.

The radical Z is preferably R—Ph—, and the radical Y is preferably —S—, —NH— or a direct bond.

Accordingly, the invention particularly relates to those compounds of formula I in which at least one of the radicals mentioned has one of the abovementioned preferred meanings. Some preferred groups of compounds may be expressed by the following partial formulae Ia to Id, which correspond to formula I and wherein the radicals not defined in more detail have the meanings given for formula I, but wherein, in Ia $R^1$ is R—Ph—Y— and Y is —S—, —NH— or a direct bond;
Ib $R^1$ is R—Ph—S— and $R^2$ is H or R—Ph—S, wherein R in the groups $R^1$ and $R^2$ can be identical or different;
Ic $R^1$ is R—Ph—NH— and $R^2$ is H;
Id $R^1$ is R—Ph— and $R^2$ is H.

In the compounds of formula I which contain cyclohexylene radicals, those stereoisomers wherein the two 1,4-substituents are each in the trans-position relative to one another are preferred.

The compounds of formula I are moreover prepared by methods which are known per se, such as those described in the literature (for example in the standard works, such as Houben-Weyl, Methoden der Organischen Chemie (Methods of Organic Chemistry), Georg-Thieme-Verlag, Stuttgart, whose disclosure is incorporated by reference herein), and in particular under reaction conditions which are known and suitable for the reactions mentioned. It is also possible to use variants which are known per se but are not mentioned here in more detail.

If desired, the starting substances can also be formed in situ, in a manner such that they are not isolated from the reaction mixture, but are immediately further reacted to give the compounds of formula I.

The compounds of formula I can be obtained, in particular, by hydrolysis of the diaminonaphthoquinones of formula II, advantageously by reaction with a mineral acid, such as sulfuric acid, in about 2 to 98%, preferably about 10 to 30%, aqueous solution, at temperatures of about 10° to about 150°, preferably of about 60° to 110°.

The starting substances of formula II can be obtained conventionally, for example, by reacting the corresponding 1,5-dinitro-3-$R^1$-7-$R^2$-naphthalenes with sulfur in oleum, and those of formula II in which $R^1$ and/or $R^2$ are R—Ph— can also be obtained conventionally by arylation of 4,8-diamino-1,5-naphthoquinone with diazonium salts of the formula R—Ph—N$_2^+$An$^-$ (wherein An$^-$ is an anion customarily used with aromatic diazonium salts, for example chloride, bromide or sulfate), or by an Ullmann reaction from 4,8-diamino-2,6-dibromo-1,5-naphthoquinone and iodobenzene derivatives of the formula R—Ph—I.

To prepare a compound of formula I ($R^1$ is Z—S— or Z—NH—, in particular R—Ph—S— or R—Ph—NH—), it is furthermore possible to react a naphthazarine derivative of formula III with a compound of formula IV, in particular a mercaptan of the formula Z—SH or an amine of the formula Z—NH$_2$. This reaction is preferably carried out in the presence or absence of an additional inert solvent, at temperatures of about 0° to about 200°, preferably of 20° to 120°. Examples of suitable inert solvents include alcohols, such as methanol, ethanol and isopropanol. An excess of the compound of formula IV can also be used as the solvent. If naphthazarine (III, $R^2$ is H) itself is used, the reaction conditions can be controlled such that this compound reacts with one or two molecules of IV. If, for example, the mercaptan Z—SH is used in excess, the disubstituted product (I, $R^1$ and $R^2$ are Z—S—) is predominantly formed, and if III ($R^2$ is H) is used in excess, the monosubstituted product (I, $R^1$ is Z—S— and $R^2$ is H) is predominantly formed. In a similar manner, it is possible to obtain a disubstituted product (I, $R^1$ and $R^2$ are Z—NH—) by prolonged heating of III ($R^2$ is H) with excess amine Z—NH$_2$, while the mono-substituted product (I, $R^1$ is Z—NH—, $R^2$ is H) is predominantly formed at room temperature, even if the amine is used in excess. The compounds of formula III are either known or readily conventionally preparable by analogy to the reactions discussed above with respect to the compounds preparable from the compounds of formula II or with respect to the compounds of formula II per se.

The dielectrics according to this invention comprise 2 to 15, preferably 3 to 12, constituents, at least one of which is a naphthoquinone dyestuff of formula I. The other constituents are preferably chosen from nematic or nematogenic substances, in particular the known substances from the classes of azoxybenzenes, benzylideneanilines, biphenyls, terphenyls, phenyl or cyclohexylbenzoates, phenyl or cyclohexyl cyclohexanecarboxylates, phenylcyclohexanes, cyclohexylbiphenyls, cyclohexylcyclohexanes, cyclohexylnaphthalenes, 1,4-bis-cyclohexylbenzenes, 4,4'-bis-cyclohexylbiphenyls, phenyl- or cyclohexyl-pyrimidines, phenyl- or cyclohexyl-dioxanes, optionally halogenated stilbenes, benzyl phenyl ethers, tolanes and substituted cinnamic acids. The most important compounds which can be used as components of liquid crystal host materials can be characterized by formula V

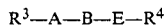  V wherein A and E are each a carbocyclic of heterocyclic ring system from the group of 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline; B is —CH=CH—, —CH=CG—, —C≡C—, —CO—O—, —CO—S, —CH=N—, —N=N—, —N(O)=N—, —CH=N(O)—, —CH$_2$—CH$_2$—, —CH$_2$—O—, —CH$_2$—S—, —COO—Ph—COO— or a C—C single bond; G is halogen, preferably chlorine, or CN; and $R^3$ and $R^4$ are alkyl, alkoxy, alkanoyloxy or alkoxycarbonyloxy each of up to 18, preferably up to 8, carbon atoms, or one of these radicals is CN, NC, NO$_2$, CF$_3$, F, Cl or Br. In most of these compounds, $R^3$ and $R^4$ differ from one another, one of these radicals usually being an alkyl or alkoxy group. However, other variants of the envisaged substituents can also be used. Many such substances and mixtures thereof are commercially available.

The dielectrics according to this invention contain as a rule 0.1 to 15, preferably 0.5 to 10 and in particular 1 to 5, percent by weight of one or more compounds of formula I. Otherwise, the compositions of such dielectrics are fully conventional. The dielectrics according to this invention are prepared in a manner which is customary per se. As a rule, the constituent used in the smaller amount is dissolved in the constituent which makes up the main constituent, preferably at elevated temperature. If a temperature above the clar point of the main constituent is chosen, it is particularly easy to observe the completeness of the solution operation.

The liquid crystal dielectrics according to this invention can be modified by suitable additives such that they can be used in all the types of guest/host display elements which have hitherto been disclosed. Such additives are known to the expert and are described in detail in the literature. For example, substances for modifying the dielectric anisotropy, the viscosity, the conductivity and/or the orientation of the nematic phases may be added. Such substances are described in, for example, German Offenlegungsschriften Nos. 2,209,127, 2,240,864, 2,321,632, 2,338,281, 2,450,088, 2,637,430, 2,853,728 and 2,902,177, all of whose disclosures are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight. In the examples, m.p. is the melting point and c.p. is the clear point of a liquid crystal substance in degrees centigrade.

EXAMPLE 1

A suspension of 1 g of 2,6-diphenyl-4,8-diamino-1,5-naphthoquinone in 200 ml of 20% $H_2SO_4$ is heated at 100° for 5 hours. The mixture is cooled and extracted with $CH_2Cl_2$ and the extract is evaporated to give 2,6-diphenyl-5,8-dihydroxy-1,4-naphthoquinone as red needles of m.p. 170°–173°.

EXAMPLES 2 TO 51

The following compounds are obtained analogously to Example 1, by hydrolysis of the corresponding 4,8-diamino-1,5-naphthoquinones:

2. 2-Phenyl-5,8-dihydroxy-1,4-naphthoquinone.
3. 2-p-Tolyl-5,8-dihydroxy-1,4-naphthoquinone.
4. 2-p-Ethylphenyl-5,8-dihydroxy-1,4-naphthoquinone.
5. 2-p-n-Propylphenyl-5,8-dihydroxy-1,4-naphthoquinone.
6. 2-p-n-Butylphenyl-5,8-dihydroxy-1,4-naphthoquinone.
7. 2-p-n-Pentylphenyl-5,8-dihydroxy-1,4-naphthoquinone.
8. 2-p-n-Hexylphenyl-5,8-dihydroxy-1,4-naphthoquinone.
9. 2-p-n-Heptylphenyl-5,8-dihydroxy-1,4-naphthoquinone.
10. 2-p-n-Octylphenyl-5,8-dihydroxy-1,4-naphthoquinone.
11. 2-p-Methoxyphenyl-5,8-dihydroxy-1,4-naphthoquinone.
12. 2-p-Ethoxyphenyl-5,8-dihydroxy-1,4-naphthoquinone.
13. 2-p-n-Propoxyphenyl-5,8-dihydroxy-1,4-naphthoquinone.
14. 2-p-n-Butoxy-5,8-dihydroxy-1,4-naphthoquinone.
15. 2-p-n-Pentyloxy-5,8-dihydroxy-1,4-naphthoquinone.
16. 2-p-n-Hexyloxy-5,8-dihydroxy-1,4-naphthoquinone.
17. 2-p-n-Heptyloxy-5,8-dihydroxy-1,4-naphthoquinone.
18. 2-p-n-Octyloxy-5,8-dihydroxy-1,4-naphthoquinone.
19. 2,6-Bis-p-tolyl-5,8-dihydroxy-1,4-naphthoquinone.
20. 2,6-Bis-p-ethylphenyl-5,8-dihydroxy-1,4-naphthoquinone.
21. 2,6-Bis-p-n-propylphenyl-5,8-dihydroxy-1,4-naphthoquinone.
22. 2,6-Bis-p-n-butylphenyl-5,8-dihydroxy-1,4-naphthoquinone.
23. 2,6-Bis-p-n-pentylphenyl-5,8-dihydroxy-1,4-naphthoquinone.
24. 2,6-Bis-p-n-hexylphenyl-5,8-dihydroxy-1,4-naphthoquinone.
25. 2,6-Bis-p-n-heptylphenyl-5,8-dihydroxy-1,4-naphthoquinone.
26. 2,6-Bis-p-n-octylphenyl-5,8-dihydroxy-1,4-naphthoquinone.
27. 2,6-Bis-p-methoxyphenyl-5,8-dihydroxy-1,4-naphthoquinone.
28. 2,6-Bis-p-ethoxyphenyl-5,8-dihydroxy-1,4-naphthoquinone.
29. 2,6-Bis-p-n-propoxyphenyl-5,8-dihydroxy-1,4-naphthoquinone.
30. 2,6-Bis-p-n-butoxyphenyl-5,8-dihydroxy-1,4-naphthoquinone.
31. 2,6-Bis-p-n-pentyloxyphenyl-5,8-dihydroxy-1,4-naphthoquinone.
32. 2,6-Bis-p-n-hexyloxyphenyl-5,8-dihydroxy-1,4-naphthoquinone.
33. 2,6-Bis-p-n-heptyloxyphenyl-5,8-dihydroxy-1,4-naphthoquinone.
34. 2,6-Bis-p-n-octyloxyphenyl-5,8-dihydroxy-1,4-naphthoquinone.
35. 2,6-Dipropyl-5,8-dihydroxy-1,4-naphthoquinone.
36. 2,6-Dioctyl-5,8-dihydroxy-1,4-naphthoquinone.
37. 2,6-Dipropoxy-5,8-dihydroxy-1,4-naphthoquinone.
38. 2,6-Dioctyloxy-5,8-dihydroxy-1,4-naphthoquinone.
39. 2-Methyl-6-p-propoxyphenyl-5,8-dihydroxy-1,4-naphthoquinone.
40. 2-Ethyl-6-p-butoxyphenyl-5,8-dihydroxy-1,4-naphthoquinone.
41. 2-Methoxy-6-p-pentyloxyphenyl-5,8-dihydroxy-1,4-naphthoquinone.
42. 2-Ethoxy-6-p-hexyloxyphenyl-5,8-dihydroxy-1,4-naphthoquinone.
43. 2-(4'-Pentyloxy-4-biphenylyl)-5,8-dihydroxy-1,4-naphthoquinone.
44. 2-(trans-4-Pentyl-cyclohexyl)-5,8-dihydroxy-1,4-naphthoquinone.
45. 2-(trans-4-(trans-4-Pentylcyclohexyl)-cyclohexyl)-5,8-dihydroxy-1,4-naphthoquinone.
46. 2-(p-trans-4-Pentylcyclohexyl-phenyl)-5,8-dihydroxy-1,4-naphthoquinone.
47. 2-(trans-4-p-Pentyloxyphenyl-cyclohexyl)-5,8-dihydroxy-1,4-naphthoquinone.
48. 2-p-Hexyloxybenzyl-5,8-dihydroxy-1,4-naphthoquinone.
49. 2-p-Hexyloxyphenoxy-5,8-dihydroxy-1,4-naphthoquinone.
50. 2-(2-p-Hexyloxyphenylethyl)-5,8-dihydroxy-1,4-naphthoquinone.
51. 2-p-Hexyloxybenzyloxy-5,8-dihydroxy-1,4-naphthoquinone.

EXAMPLE 52

A solution of 5 g of 5,8-dihydroxy-1,4-naphthoquinone and 1.1 g of thiophenol in 500 ml of ethanol is boiled for 10 minutes and cooled. The mixture is filtered; the filtrate is concentrated to about 200 ml; and the 2-phenylthio-5,8-dihydroxy-1,4-naphthoquinone which has precipitated is filtered off. m.p. 133°–134°.

EXAMPLES 53 TO 68

The following compounds are obtained analogously to Example 52, with the corresponding phenylmercaptans:
53. 2-p-Ethylphenylthio-5,8-dihydroxy-1,4-naphthoquinone.
54. 2-p-Propylphenylthio-5,8-dihydroxy-1,4-naphthoquinone.
55. 2-p-Butylphenylthio-5,8-dihydroxy-1,4-naphthoquinone.
56. 2-p-Pentylphenylthio-5,8-dihydroxy-1,4-naphthoquinone.
57. 2-p-Hexylphenylthio-5,8-dihydroxy-1,4-naphthoquinone.
58. 2-p-Heptylphenylthio-5,8-dihydroxy-1,4-naphthoquinone.
59. 2-p-Octylphenylthio-5,8-dihydroxy-1,4-naphthoquinone.
60. 2-p-Methoxyphenylthio-5,8-dihydroxy-1,4-naphthoquinone.
61. 2-p-Ethoxyphenylthio-5,8-dihydroxy-1,4-naphthoquinone.
62. 2-p-Propoxyphenylthio-5,8-dihydroxy-1,4-naphthoquinone.
63. 2-p-Butoxyphenylthio-5,8-dihydroxy-1,4-naphthoquinone.
64. 2-p-Pentyloxyphenylthio-5,8-dihydroxy-1,4-naphthoquinone.
65. 2-p-Hexyloxyphenylthio-5,8-dihydroxy-1,4-naphthoquinone.
66. 2-p-Heptyloxyphenylthio-5,8-dihydroxy-1,4-naphthoquinone.
67. 2-p-Octyloxyphenylthio-5,8-dihydroxy-1,4-naphthoquinone.
68. 2-p-Hexyloxybenzylthio-5,8-dihydroxy-1,4-naphthoquinone.

EXAMPLE 69

A solution of 7 g of thiophenol in 30 ml of ethanol is added to a solution of 1.9 g of 5,8-dihydroxy-1,4-naphthoquinone in 130 ml of ethanol at 20°. The mixture is boiled for 15 minutes and cooled. The 2,6-bis-phenylthio-5,8-dihydroxy-1,4-naphthoquinone is filtered off. m.p. 206°–207°.

EXAMPLES 70 TO 85

The following compounds are obtained analogously to Example 69, with excesses of the corresponding phenylmercaptans:
70. 2,6-Bis-(p-ethylphenylthio)-5,8-dihydroxy-1,4-naphthoquinone.
71. 2,6-Bis-(p-propylphenylthio)-5,8-dihydroxy-1,4-naphthoquinone.
72. 2,6-Bis-(p-butylphenylthio)-5,8-dihydroxy-1,4-naphthoquinone.
73. 2,6-Bis-(p-pentylphenylthio)-5,8-dihydroxy-1,4-naphthoquinone.
74. 2,6-Bis-(p-hexylphenylthio)-5,8-dihydroxy-1,4-naphthoquinone.
75. 2,6-Bis-(p-heptylphenylthio)-5,8-dihydroxy-1,4-naphthoquinone, m.p. 161°–162°.
76. 2,6-Bis-(p-octylphenylthio)-5,8-dihydroxy-1,4-naphthoquinone.
77. 2,6-Bis-(p-methoxyphenylthio)-5,8-dihydroxy-1,4-naphthoquinone.
78. 2,6-Bis-(p-ethoxyphenylthio)-5,8-dihydroxy-1,4-naphthoquinone.
79. 2,6-Bis-(p-propoxyphenylthio)-5,8-dihydroxy-1,4-naphthoquinone.
80. 2,6-Bis-(p-butoxyphenylthio)-5,8-dihydroxy-1,4-naphthoquinone.
81. 2,6-Bis-(p-pentyloxyphenylthio)-5,8-dihydroxy-1,4-naphthoquinone.
82. 2,6-Bis-(p-hexyloxyphenylthio)-5,8-dihydroxy-1,4-naphthoquinone.
83. 2,6-Bis-(p-heptyloxyphenylthio)-5,8-dihydroxy-1,4-naphthoquinone.
84. 2,6-Bis-(p-octyloxyphenylthio)-5,8-dihydroxy-1,4-naphthoquinone.
85. 2,6-Bis-(p-hexyloxybenzylthio)-5,8-dihydroxy-1,4-naphthoquinone.

EXAMPLE 86

1.9 g of 5,8-dihydroxy-1,4-naphthoquinone is introduced into 30 ml of p-toluidine and the mixture is stirred at 20° for 10 hours. After 80 ml of ethanol have been added dropwise, 2-p-toluidino-5,8-dihydroxy-1,4-naphthoquinone precipitates.

EXAMPLES 87 TO 102

The following compounds are obtained analogously to Example 86, with the corresponding aniline derivatives:
87. 2-p-Ethylanilino-5,8-dihydroxy-1,4-naphthoquinone.
88. 2-p-Propylanilino-5,8-dihydroxy-1,4-naphthoquinone.
89. 2-p-Butylanilino-5,8-dihydroxy-1,4-naphthoquinone.
90. 2-p-Pentylanilino-5,8-dihydroxy-1,4-naphthoquinone.
91. 2-p-Hexylanilino-5,8-dihydroxy-1,4-naphthoquinone.
92. 2-p-Heptylanilino-5,8-dihydroxy-1,4-naphthoquinone.
93. 2-p-Octylanilino-5,8-dihydroxy-1,4-naphthoquinone.
94. 2-p-Methoxyanilino-5,8-dihydroxy-1,4-naphthoquinone.
95. 2-p-Ethoxyanilino-5,8-dihydroxy-1,4-naphthoquinone.
96. 2-p-Propoxyanilino-5,8-dihydroxy-1,4-naphthoquinone.
97. 2-p-Butoxyanilino-5,8-dihydroxy-1,4-naphthoquinone.
98. 2-p-Pentyloxyanilino-5,8-dihydroxy-1,4-naphthoquinone.
99. 2-p-Hexyloxyanilino-5,8-dihydroxy-1,4-naphthoquinone.
100. 2-p-Heptyloxyanilino-5,8-dihydroxy-1,4-naphthoquinone.
101. 2-p-Octyloxyanilino-5,8-dihydroxy-1,4-naphthoquinone.
102. 2-p-Hexyloxybenzylamino-5,8-dihydroxy-1,4-naphthoquinone.

EXAMPLE 103

A mixture of 1.9 g of 5,8-dihydroxy-1,4-naphthoquinone and 40 ml of aniline is heated at 100° for 8 hours. After the mixture has been cooled and diluted with ethanol, 2,6-bis-anilino-5,8-dihydroxy-1,4-naphthoquinone is obtained.

EXAMPLES 104 TO 120

The following compounds are obtained analogously to Example 103, with the corresponding aniline derivatives:
104. 2,6-Bis-p-toluidino-5,8-dihydroxy-1,4-naphthoquinone.
105. 2,6-Bis-p-ethylanilino-5,8-dihydroxy-1,4-naphthoquinone.
106. 2,6-Bis-p-propylanilino-5,8-dihydroxy-1,4-naphthoquinone.
107. 2,6-Bis-p-butylanilino-5,8-dihydroxy-1,4-naphthoquinone.
108. 2,6-Bis-p-pentylanilino-5,8-dihydroxy-1,4-naphthoquinone.
109. 2,6-Bis-p-hexylanilino-5,8-dihydroxy-1,4-naphthoquinone.
110. 2,6-Bis-p-heptylanilino-5,8-dihydroxy-1,4-naphthoquinone.
111. 2,6-Bis-p-octylanilino-5,8-dihydroxy-1,4-naphthoquinone.
112. 2,6-Bis-p-methoxyanilino-5,8-dihydroxy-1,4-naphthoquinone.
113. 2,6-Bis-p-ethoxyanilino-5,8-dihydroxy-1,4-naphthoquinone.
114. 2,6-Bis-p-propoxyanilino-5,8-dihydroxy-1,4-naphthoquinone.
115. 2,6-Bis-p-butoxyanilino-5,8-dihydroxy-1,4-naphthoquinone.
116. 2,6-Bis-p-pentyloxyanilino-5,8-dihydroxy-1,4-naphthoquinone.
117. 2,6-Bis-p-hexyloxyanilino-5,8-dihydroxy-1,4-naphthoquinone.
118. 2,6-Bis-p-heptyloxyanilino-5,8-dihydroxy-1,4-naphthoquinone.
119. 2,6-Bis-p-octyloxyanilino-5,8-dihydroxy-1,4-naphthoquinone.
120. 2,6-Bis-p-hexyloxybenzylamino-5,8-dihydroxy-1,4-naphthoquinone.

The following examples are examples of dielectrics according to this invention:

EXAMPLE A

1% of 2-phenylthio-5,8-dihydroxy-1,4-naphthoquinone is added to a liquid crystal dielectric consisting of 18% of 4-(trans-4-propylcyclohexyl)-benzonitrile, 14% of 4-(trans-4-butylcyclohexyl)-benzonitrile, 25% of 4-(trans-4-pentylcyclohexyl)-benzonitrile, 15% of 4-(trans-4-heptylcyclohexyl)-benzonitrile, 7% of 4-(trans-4-pentylcyclohexyl)-4'-cyanobiphenyl, 7% of 4-(trans-4-pentylcyclohexyl)-4'-(trans-4-propylcyclohexyl)-biphenyl, 6% of 4-pentyl-4'-cyano-p-terphenyl and 8% of p-trans-4-propylcyclohexylphenyl trans-4-butylcyclohexane-carboxylate. The resulting dielectric exhibits a red color with an absorption maximum at 523 nm.

EXAMPLE B 0.8% of 2,6-bis-(p-propylphenylthio)-5,8-dihydroxy-1,4-naphthoquinone is dissolved in a liquid crystal dielectric consisting of 22% of 4-(trans-4-propylcyclohexyl)-benzonitrile, 19% of 4-(trans-4-butylcyclohexyl)-benzonitrile, 30% of 4-(trans-4-pentylcyclohexyl)-benzonitrile, 15% of 4-(trans-4-pentylcyclohexyl)-4'-cyanobiphenyl and 14% of 4-pentyl-4'-cyano-p-terphenyl; $\lambda_{max}$ 538 nm.

EXAMPLE C

2% of 2-p-propylphenylthio-5,8-dihydroxy-1,4-naphthoquinone is dissolved in the base dielectric mentioned in Example B; $\lambda_{max}$ 522 nm.

EXAMPLE D 1.8% of 2,6-bis-(p-heptylphenylthio)-5,8-dihydroxy-1,4-naphthoquinone is dissolved in the base dielectric mentioned in Example A; $\lambda_{max}$ 539 nm.

EXAMPLE E 2.5% of 2-p-heptylphenylthio-5,8-dihydroxy-1,4-naphthoquinone is dissolved in the base dielectric mentioned in Example A; $\lambda_{max}$ 522 nm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A liquid crystal dielectric comprising at least one liquid crystalline compound and at least one dyestuff of the formula

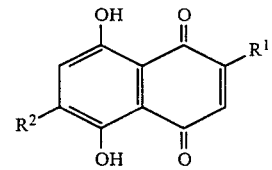

wherein $R^1$ and $R^2$ are identical or different and each is alkyl or alkoxy each of 3 to 8 C atoms or a group Z—Y—, or one of $R^1$ and $R^2$ can also be hydrogen, methyl, ethyl, methoxy or ethoxy; Z is R—Ph—, R—Ph—Ph—, R—Cy—, R—Cy—Cy—, R—Cy—Ph— or R—Ph—Cy; Ph is 1,4-phenylene; Cy is 1,4-cyclohexylene; Y is —CH$_2$—, —O—, —S—, —NH—, —CH$_2$CH$_2$—, —CH$_2$—O—, —CH$_2$—S—, —CH$_2$—NH— or a direct bond; and R is hydrogen or alkyl or alkoxy, each of 1–8 C atoms.

2. A composition of claim 1 wherein at least one of $R^1$ and $R^2$ is a straight chain alkyl group of 3–7 C atoms.

3. A composition of claim 1 wherein at least one of $R^1$ and $R^2$ is a straight chain alkoxy group of 3–7 C atoms.

4. A composition of claim 1 wherein one of $R^1$ and $R^2$ is methyl, ethyl, methoxy or ethoxy.

5. A composition of claim 1 wherein Z is R—Ph.

6. A composition of claim 1 wherein Y is —S—, —NH— or a direct bond.

7. A composition of claim 1 wherein $R^1$ is R—Ph—Y— and Y is —S—, —NH— or a direct bond.

8. A composition of claim 1 wherein $R^1$ is R—Ph—S— and $R^2$ is H or R—Ph—S, wherein R in the groups $R^1$ and $R^2$ can be identical or different.

9. A composition of claim 1 wherein $R^1$ is R—Ph—NH— and $R^2$ is H.

10. A composition of claim 1 wherein $R^1$ is R—Ph— and $R^2$ is H.

11. In an electro-optical display element comprising a liquid crystal dielectric, the improvement wherein the liquid crystal dielectric is that of claim 1.

* * * * *